(12) United States Patent
Deshazer et al.

(10) Patent No.: US 10,978,743 B1
(45) Date of Patent: Apr. 13, 2021

(54) OPTIMIZATION OF ELECTROCHEMICAL CELL

(71) Applicant: Natron Energy, Inc., Santa Clara, CA (US)

(72) Inventors: Heather Dawn Deshazer, Sunnyvale, CA (US); Grace Marjorie Yee, Los Altos Hills, CA (US); Daniel Friebel, San Carlos, CA (US); Ali Firouzi, Saratoga, CA (US); Colin Deane Wessells, Menlo Park, CA (US)

(73) Assignee: Natron Energy, Inc., Santa Clara, CA (US)

( * ) Notice: Subject to any disclaimer, the term of this patent is extended or adjusted under 35 U.S.C. 154(b) by 0 days.

(21) Appl. No.: 16/708,213

(22) Filed: Dec. 9, 2019

(51) Int. Cl.
| | |
|---|---|
| *H01M 10/0569* | (2010.01) |
| *H01M 2/16* | (2006.01) |
| *H01M 10/0568* | (2010.01) |
| *H01M 10/0583* | (2010.01) |
| *H01M 10/04* | (2006.01) |

(52) U.S. Cl.
CPC ..... *H01M 10/0569* (2013.01); *H01M 2/1673* (2013.01); *H01M 10/0568* (2013.01); *H01M 10/0459* (2013.01); *H01M 10/0583* (2013.01)

(58) Field of Classification Search
CPC ............... H01M 4/40; H01M 10/0568; H01M 10/0569; H01M 10/0459
See application file for complete search history.

(56) References Cited

U.S. PATENT DOCUMENTS

| | | | | |
|---|---|---|---|---|
| 8,652,672 | B2* | 2/2014 | Whitacre | H01M 2/1077 429/99 |
| 9,099,718 | B2 | 8/2015 | Lu et al. | |
| 2005/0175901 | A1* | 8/2005 | Kawakami | H01M 4/40 429/231.95 |
| 2009/0286164 | A1* | 11/2009 | Wada | H01M 4/366 429/338 |
| 2019/0190006 | A1* | 6/2019 | Wang | H01M 4/136 |

OTHER PUBLICATIONS

Imhof, R. In Situ Investigation of the Electrochemical Reduction of Carbonate Electrolyte Solutions at Graphite Electrodes. J. Electrochem. Soc., 145, 1081-1087 (1998).
Wu, J, et al, "Modification of Transition-Metal Redox byInterstitial Water in HexacyanometallateElectrodes forSodium-Ion Batteries" J. Am. Chem. Soc., 139, 18358-18364 (2017).
Wu, J, et al, "Modification of Transition-Metal Redox byInterstitial Water in HexacyanometallateElectrodes forSodium-Ion Batteries"—Supplemental Table—J. Am. Chem. Soc., 139, 18358-18364 (2017).

* cited by examiner

*Primary Examiner* — Jonathan G Jelsma
(74) *Attorney, Agent, or Firm* — Patent Law Offices Michael E. Woods; Michael E. Woods

(57) ABSTRACT

A system and method for optimizing electrochemical cells including electrodes employing coordination compounds by mediating water content within a desired water content profile that includes sufficient coordinated water and reduces non-coordinated water below a desired target.

8 Claims, 10 Drawing Sheets

| Example Description | Example # | Initial Residual Moisture (%) | Initial coodinated water (%) | Initial non-coordinated water (%) | Final Residual Moisture (%) | Final coordinated water (%) | Final non-coordinated water (%) |
|---|---|---|---|---|---|---|---|
| Monolayer Electrode Drying | 1 (anode) | 9.1 | 1.0 | 8.1 | 7.1 | 1.0 | 6.1 |
|  | 2 (cathode) | 18.2 | 4.4 | 13.8 | 6.9 | 4.4 | 2.5 |
| Powder Drying | 1 (anode) | 8.7 | 2.5 | 6.2 | 7.1 | 2.5 | 4.6 |
|  | 2 (cathode) | 16.3 | 3.9 | 12.3 | 7.0 | 3.9 | 3.0 |
| Stacks of Electrodes (general) | 3 | 13.4 | 3.2 | 10.2 | 6.7 | 3.2 | 3.4 |
|  |  |  |  |  | 7.2 | 3.2 | 4.0 |
| Stacks of Electrodes (specific) | 5 (cathode) | 18.4 | 4.5 | 14.0 | 7.0 | 4.5 | 2.6 |
|  | 6 (anode) | 8.1 | 0.9 | 7.2 | 7.1 | 0.9 | 6.1 |
| Cell drying (specific) | 8 (cell cathode) | 18.4 | 4.5 | 14.0 | 14.0 | 4.5 | 9.6 |
|  | 8 (cell anode) | 8.1 | 2.3 | 5.8 | 5.8 | 2.3 | 3.5 |

FIG. 9

AS-SYNTHESIZED MATERIALS

| Anode | Na | Mn | [Mn(CN)6] | vac. | H2O total | H2O coord. | H2O non-coord |
|---|---|---|---|---|---|---|---|
| | 1.68 | 1.00 | 0.92 | 0.08 | 1.61 | 0.48 | 1.12 |
| | dry | H2O total | H2O coord | H2O non-coord | | RM | Coord | Non-Coord |
| mass | 287.5 | 28.9 | 8.72 | 20.2 | | 10.1% | 3.0% | 7.0% |

| Cathode | Na | Mn | Fe | [Fe(CN)6] | vac. | H2O total | H2O coord. | H2O non-coord |
|---|---|---|---|---|---|---|---|---|
| | 1.22 | 0.78 | 0.22 | 0.88 | 0.12 | 2.56 | 0.69 | 1.86 |
| | dry | H2O total | H2O coord | H2O non-coord | | RM | Coord | Non-Coord |
| mass | 270.8 | 46.0 | 12.5 | 33.5 | | 17.0% | 4.6% | 12.4% |

*FIG. 10*

OPTIMIZATION OF ELECTROCHEMICAL CELL

FIELD OF THE INVENTION

The present invention relates generally to electrochemical cells using a coordination compound in one or more electrodes, and more specifically, but not exclusively, to improvement in electrochemical cell operation by controlling a water content of electrochemical cells having one or more electrodes including one or more transition metal cyanide coordination compounds.

BACKGROUND OF THE INVENTION

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Electrochemical cells are often believed to use electrode materials that fall into one of two classes: (i) a material containing aqueous electrolytes or (ii) anhydrous electrolytes. Examples of the former include lead acid cells and nickel/metal hydride cells. Examples of the latter include lithium-ion cells. It is well established that in cells containing anhydrous electrolytes, any trace water impurity, even at a low concentration of parts-per-million, will degrade the performance of the cell in one or more performance metrics. The solution is therefore to implement rigorous dry room processes for preparation of the component materials in the cell and cell assembly. Electrode components will be dried as much as possible in an effort to remove as much trace water as possible.

For example, each of the cell materials is independently dried in a special room having water/moisture control (a dry room). Subsequently these independently dried materials are then brought to an assembly area to create the individual cells and then assemble these cells into a stack assembly (a cell stack). This process adds to the complexity, risk, and resource costs in production of these cell stacks.

Regarding water content for anhydrous electrolyte-containing cells, for example, see Reference [1]—Imhof, with FIG. 6 of Reference [1] illustrating that an increasing amount of ppm-level water impurity decreases a reversibility of a charging/discharging process of a graphite electrode in a Li-ion cell. This is a conclusion of Reference [1] on page 1087: "experiments with EC/DMC-based electrolytes containing different amounts of water have shown that the Li+ intercalation process becomes less reversible as the water content increases."

Some materials used as an electrode in an electrochemical cell may include use of a transition metal cyanide coordination compound (TMCCC). Reference [2] treats TMCCC materials as belonging to the (ii) anhydrous class. Reference [2] describes methods for drying TMCCC electrode materials to improve cell performance. In particular, Reference [2] teaches a manganese hexacyanoferrate (MnHCF) TMCCC electrode material that is dried to a low enough residual moisture (RM) that all of the interstitial water is removed. When this occurs, the MnHCF material undergoes a phase transition from a cubic phase to a rhombohedral phase (column 8). When this phase change occurs, all of the electrochemical capacity of the MnHCF electrode is captured in a single charge-discharge plateau. Having a single reaction plateau is desirable because it allows an electrochemical cell to be operated in a narrower voltage range, decreasing the cost and complexity of integrating the cell into other electronic systems. To achieve this result, Reference [2] further describes the use of a vacuum drying process in which the vacuum pressure is below 0.1 torr (column 7 and claim 1).

Claim 1 of Reference [2] claims a TMCCC in which a range of water may be present (z in a range of 0 to 3.5). However, column 8 describes in detail that all of the interstitial water must be removed from the structure to achieve the rhombohedral phase that has a single reaction plateau. Furthermore, in Reference [3] the same inventors show that the rhombohedral phase having a single reaction plateau is completely anhydrous. Throughout Reference [3], the single plateau phase is referred to as "anhydrated", as opposed to the "hydrated" phase having two reaction plateaus. Furthermore, in the supplementary information of Reference [3], FIG. S2 shows that the "anhydrated" phase contains zero water. In other words, the samples of MnHCF that undergo a phase transition when dehydrated contain no water that is tightly bound to the lattice, and all of the water present before drying is interstitial. Therefore, one of ordinary skill in the art would consider the teachings of Reference [2] and Reference [3] to indicate that the rhombohedral, single-plateau phase is achieved when all of the water is removed from the structure, or in terms relevant to claim 1 of Reference [2], when z=0.

Note that "anhydrated" as used in Reference [3] is not a commonly used term. It is usually defined as the anhydrous form of a material that typically contains water. A reasonable interpretation of Reference [3] is that "anhydrated" is synonymous with "anhydrous", meaning a substance that contains no water or only a negligible quantity water as a trace impurity. In contrast, if Reference [3] had referred to the vacuum dried MnHCF as "dehydrated", then it would be commonly understood that either some or all of the water initially present in the material had been removed. In consideration of Figure S2 as discussed above, the authors' use of "anhydrated" rather than "dehydrated" indicates intent to express that all of the water was removed from the material.

In contrast to these disclosures, TMCCC materials used as an electrode in an electrochemical cell may not exclusively fall into these aqueous or anhydrous classes. Optimization of operation of an electrochemical cell including TMCCC materials by managing the water content may be more complex than heretofore appreciated by conventional battery manufacturing techniques.

What may be beneficial is a system and method for optimizing electrochemical cells including electrodes employing coordination compounds.

BRIEF SUMMARY OF THE INVENTION

Disclosed is a system and method for optimizing electrochemical cells including electrodes employing coordination compounds. The following summary of the invention is provided to facilitate an understanding of some of the technical features related to managing water content of electrodes including TMCCC materials, and is not intended to be a full description of the present invention. A full appreciation of the various aspects of the invention can be gained by taking the entire specification, claims, drawings, and abstract as a whole. The present invention is applicable to other coordination compounds in addition to TMCCC materials, particularly those that include water disposed in a crystal structure locations and water disposed in a non-coordinated manner.

An embodiment of the present invention includes a new class of battery cell that is based on electrodes that contain transition metal cyanide coordination compound (TMCCC) materials. These TMCCC materials naturally contain water. Some of the water they contain is tightly bound within the crystal structure of the material (e.g., lattice-bound), and some interstitial water may reversibly move in and out of the electrode as it is charged and discharged, and some water may be bound to various surfaces of particles of the TMCCC materials (collectively this non-lattice bound may be referred to herein as non-coordinated water). Some non-coordinated water may move in and out of the TMCCC material may then undergo chemical or electrochemical reactions with other cell components and may thereby cause degradation of cell performance. Based on Reference [1], [2], and [3], one may expect that removal of all water from the TMCCC material would enhance electrode and cell performance by eliminating these undesirable reactions. However, in a surprising result, total dehydration of a TMCCC material, including removal of the water that is tightly bound within the crystal structure, is demonstrated to degrade the performance of the wholly dehydrated TMCCC material. Note Reference [1], Reference [2], and Reference [3] do not appear to teach or discuss non-coordinated water including anything other than interstitial water. Other types of water may include surface water and water present in any pores within the TMCCC structure, including micropores. There may be several different reasons why these references do not discuss this type of water content, for example it may have been believed not to be relevant/impactful or its presence was not appreciated.

An embodiment of the present invention describes a process by which the performance of a cell containing one or more TMCCC materials may be optimized by providing the electrodes with an optimal amount of residual moisture (RM). Too high a RM, and enough non-coordinated, including mobile, water is present that cell performance may degrade. Too low a RM, and the TMCCC electrode performance is decreased. But by fine-tuning the RM of the electrode, an optimal balance of electrode and cell performance properties may be achieved. The moisture content may be regulated by partial dehydration and/or partial reabsorption of water to achieve a desired RM that is more than anhydrous but that may be less than the water content of a freshly synthesized, unprocessed TMCCC material. This intermediate quantity or concentration of electrode water content is an aspect of some embodiments of the present invention.

An embodiment of the present invention may include improved manufacturing. As less aggressive moisture removal processes may be required, some of the processing steps may be simplified. For example, an aspect of the present invention includes assembly of an entire electrochemical cell, or a collection of such cells into a cell stack, one or more cells including at least one electrode with a TMCCC material having a water content outside desired range(s), and then optimizing the water in the assembled cell or cell stack. This is in contrast to dehydrating/hydrating the individual materials and then assembling using the dehydrated/hydrated materials.

An embodiment of the present invention may include a method of optimizing cell performance including dehydrating/hydrating at least one electrode to a controlled residual moisture. Additional embodiments may include a target range of residual moistures, dehydrating/hydrating conditions/apparatus, and the like.

An embodiment of the present invention may include a composition of matter of an electrochemical cell in which one or more electrodes contain a set nonzero amount of water wherein a specific amount of water (i.e., greater than zero and less than a threshold), distinguished from electrochemical cells with one or more electrodes containing TMCCC materials having an undefined n>0 amount of water.

An embodiment of the present invention may include an electrode including a coordination compound, an electrochemical cell with one or more electrodes of such material, and/or an electrochemical cell stack including one or more such electrochemical cells, the coordination compound (e.g., a TMCCC material) having a crystal structure with residual moisture (RM) presented in at least two forms, a first form bound into the crystal structure and a second form with water free from the crystal structure (e.g., non-coordinated water) with a desired RM including the first form fully maintained to preserve the crystal structure and an optimally selected amount of the second form. The water content of the TMCCC material will always be greater than zero but having a maximum necessary or desired for the crystalline/lattice structure. The presence of additional non-coordinated water in a TMCCC above the amount included in a desired RM is considered an undesired impurity, the presence of which degrades operation, and desirably is reduced as are other undesired impurities.

An embodiment of the present invention includes performance improvement of an electrochemical cell having at least one electrode including TMCCC materials with a water content outside of a preferred water range with sufficient amounts of first-form residual moisture to maintain the crystal structure and electrochemical properties of the material and as little as possible of the second-form residual moisture to minimize non-coordinated or other non-crystal water, by adjusting the total residual moisture of one or more of the electrodes to be within the preferred water range.

An embodiment of the present invention may include a method of making an electrochemical cell including a cell stack including one or more anodes, one or more separators, and one or more cathodes, including a dehydrating/hydrating step in which the cell stack is exposed to a temperature and a pressure for a duration, wherein a first of either said anodes or said cathodes includes a first TMCCC material and includes a first residual moisture RM1, and wherein said dehydrating/hydrating step results in a decrease in the moisture of the TMCCC-containing electrodes to RM2<RM1, and wherein the first TMCCC material is described by the formula $A_xP_y[R(CN)_6]_z(H_2O)_n$ wherein A includes one or more alkali cations, wherein P and R include one or more divalent or trivalent transition metal cations, wherein $0.5<z<1$, wherein $n=6*(1-z)+m$, and wherein $n>0$, wherein $6*(1-z)$ is the quantity of lattice bound water and m is the quantity of non-coordinated water, and wherein $m \geq 0$.

A method of producing a cell stack for an electrochemical cell including a plurality of layers, each including an anode electrode, a cathode electrode, and a separator interposed therebetween, and wherein all of the anodes in the plurality of layers are in electronic communication, and wherein all of the cathodes in the plurality of layers are in electronic communication, and wherein at least one electrode includes a coordinated compound material including a water content quantity that includes a degradation of a set of electrochemical properties when present during an electrochemical cycling of the cell stack, including a) manufacturing a set of electrodes wherein at least a subset of the set of electrodes include the anode electrodes and the cathode electrodes with the coordination compound having the water content; b) assembling the cell stack using the subset of electrodes including the water content, the cell stack assembling b) producing an assembled cell stack having the subset of electrodes including the water content; and c) exposing the assembled cell stack having the set of subset of electrodes including the water content to a water mediating process configured to mediate the water content of the electrodes of the subset of electrodes within a mediated water content quantity; wherein the mediated water content quantity includes a reduction of the degradation of the set of electrochemical properties when present during an electrochemical cycling of the assembled cell stack.

A method of producing a cell stack of an electrochemical cell, including a plurality of layers, each layer including an anode electrode, a cathode electrode, and a separator interposed therebetween, and wherein all of the anodes in the plurality of layers are in electronic communication, and wherein all of the cathodes in the plurality of layers are in electronic communication, and wherein at least one electrode includes a coordinated compound material, having a residual moisture outside of a desired residual moisture profile, including a) assembling the cell stack while the residual moisture of the at least one electrode in each electrochemical cell is outside of the desired residual moisture profile; and thereafter: b) exposing the cell stack to a water mediating process to adjust the residual moisture of the at least one electrode in each electrochemical cell within the desired residual moisture profile.

Any of the embodiments described herein may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

Other features, benefits, and advantages of the present invention will be apparent upon a review of the present disclosure, including the specification, drawings, and claims.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

FIG. 9 illustrates a table including residual moisture, coordinated water, and non-coordinated water before and after drying for selected examples of materials presented herein; and FIG. 10 illustrates a table including a composition of various materials on a molar basis, and also including a calculation of a residual moisture, coordinated water, and non-coordinated water on a mass percentage basis.

DETAILED DESCRIPTION OF THE INVENTION

Figure 1:
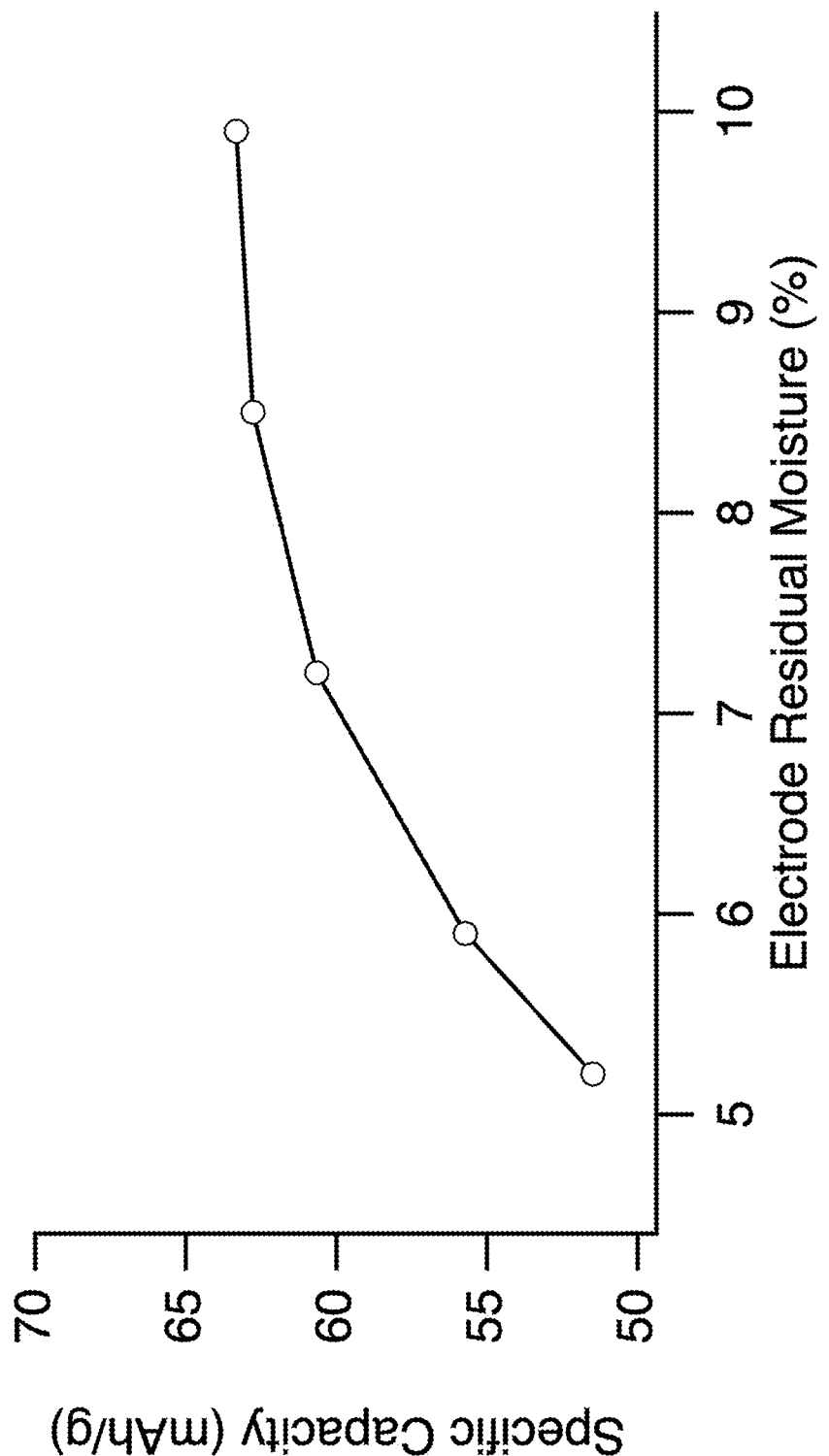
FIG. 1 illustrates a specific capacity of electrodes containing a sodium manganese hexacyanomanganate TMCCC anode material as a function of the residual moisture of the electrodes after drying.

Embodiments of the present invention provide a system and method for optimizing electrochemical cells including electrodes employing coordination compounds. The following description is presented to enable one of ordinary skill in the art to make and use the invention and is provided in the context of a patent application and its requirements.

Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Definitions

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The following definitions apply to some of the aspects described with respect to some embodiments of the invention. These definitions may likewise be expanded upon herein.

As used herein, the term "or" includes "and/or" and the term "and/or" includes any and all combinations of one or more of the associated listed items. Expressions such as "at least one of," when preceding a list of elements, modify the entire list of elements and do not modify the individual elements of the list.

As used herein, the singular terms "a," "an," and "the" include plural referents unless the context clearly dictates otherwise. Thus, for example, reference to an object can include multiple objects unless the context clearly dictates otherwise.

Also, as used in the description herein and throughout the claims that follow, the meaning of "in" includes "in" and "on" unless the context clearly dictates otherwise. It will be understood that when an element is referred to as being "on" another element, it can be directly on the other element or intervening elements may be present therebetween. In contrast, when an element is referred to as being "directly on" another element, there are no intervening elements present.

As used herein, the term "set" refers to a collection of one or more objects. Thus, for example, a set of objects can include a single object or multiple objects. Objects of a set also can be referred to as members of the set. Objects of a set can be the same or different. In some instances, objects of a set can share one or more common properties.

As used herein, the term "adjacent" refers to being near or adjoining. Adjacent objects can be spaced apart from one another or can be in actual or direct contact with one another. In some instances, adjacent objects can be coupled to one another or can be formed integrally with one another.

As used herein, the terms "connect," "connected," and "connecting" refer to a direct attachment or link. Connected objects have no or no substantial intermediary object or set of objects, as the context indicates.

As used herein, the terms "couple," "coupled," and "coupling" refer to an operational connection or linking. Coupled objects can be directly connected to one another or can be indirectly connected to one another, such as via an intermediary set of objects.

The use of the term "about" applies to all numeric values, whether or not explicitly indicated. This term generally refers to a range of numbers that one of ordinary skill in the art would consider as a reasonable amount of deviation to the recited numeric values (i.e., having the equivalent function or result). For example, this term can be construed as including a deviation of ±10 percent of the given numeric value provided such a deviation does not alter the end function or result of the value. Therefore, a value of about 1% can be construed to be a range from 0.9% to 1.1%.

As used herein, the terms "substantially" and "substantial" refer to a considerable degree or extent. When used in conjunction with an event or circumstance, the terms can refer to instances in which the event or circumstance occurs precisely as well as instances in which the event or circumstance occurs to a close approximation, such as accounting for typical tolerance levels or variability of the embodiments described herein.

As used herein, the terms "optional" and "optionally" mean that the subsequently described event or circumstance may or may not occur and that the description includes instances where the event or circumstance occurs and instances in which it does not.

As used herein, the term "size" refers to a characteristic dimension of an object. Thus, for example, a size of an object that is spherical can refer to a diameter of the object. In the case of an object that is non-spherical, a size of the non-spherical object can refer to a diameter of a corresponding spherical object, where the corresponding spherical object exhibits or has a particular set of derivable or measurable properties that are substantially the same as those of the non-spherical object. Thus, for example, a size of a non-spherical object can refer to a diameter of a corresponding spherical object that exhibits light scattering or other properties that are substantially the same as those of the non-spherical object. Alternatively, or in conjunction, a size of a non-spherical object can refer to an average of various orthogonal dimensions of the object. Thus, for example, a size of an object that is a spheroidal can refer to an average of a major axis and a minor axis of the object. When referring to a set of objects as having a particular size, it is contemplated that the objects can have a distribution of sizes around the particular size. Thus, as used herein, a size of a set of objects can refer to a typical size of a distribution of sizes, such as an average size, a median size, or a peak size.

As used herein, the term "residual moisture" of a coordination compound, particularly a TMCCC material, refers to a total water content of the TMCCC. Residual moisture includes a total water mass divided by a total dry mass of the TMCCC material (the mass of the metals, CN groups, and any other chemical species such as chelating species). For example, in the case of a TMCCC with a dry mass of 100 g and a total water content of 10 g, then the residual moisture is calculated as 10 g water/100 g dry mass=10%.

As used herein, water content of coordination compound materials is complex and refers to a hybrid residual water state which identifies a lattice-bound water content (e.g., coordinated water) that preferably is just sufficient to not degrade desired electrochemical properties of the coordination compound material while removing non-lattice-bound water content (e.g., non-coordinated water) to a greatest degree possible. Non-lattice water, sometimes referred to herein as non-coordinated water, may be present in various ways, primarily as interstitial water and/or water bound to surfaces of particles of the coordination compound materials and/or water present in any pores or micropores within a TMCCC particle. Non-coordinated water above a threshold included in an optimally selected residual moisture would be considered an undesired impurity that degrades the desired electrochemical properties while lattice-bound water is considered necessary and desired. This hybrid water content state material is not, in bulk, aqueous or anhydrous. As discussed herein, absent sufficient care, water management processes (e.g., drying) may not sufficiently distinguish between coordinated and non-coordinated water in a compound coordination material. Coordination compound materials discussed herein may be used in a system including a water-containing electrolyte which may influence the water content of the coordination compound material after assembly or during use. Coordination compound materials discussed herein may further be used in a system including an initially anhydrous electrolyte, which may influence the water content of the coordination compound material after assembly or during use, and which may become aqueous during or after assembly or during use as a result of a partial or full release of non-coordinated water from the coordination compound material. The better that the electrolyte is an anhydrous electrolyte, the better the water content of the electrode material may be controlled. Manufacture of coordination compounds often results in excess water associated with the material, the excess typically included as non-coordinated water as defined herein. Sometimes the water content may be too low, sometimes characterized as removal of the coordinated water. Therefore, the water content may preferably be adjusted to a desired range having sufficient coordinated water to achieve desired electrochemical properties while minimizing, within target, non-coordinated water. A coordination compound having its residual water adjusted to a desired non-degrading water content range is referred to herein as a water mediated coordination compound material. Similarly, a coordination compound having its residual water outside this range is referred to herein as a water non-mediated coordination compound material.

As used herein, the term "aqueous" in the context of an electrolyte for an electrochemical cell means an electrolyte including water as a solvent and one or more dissolved materials with the water solvent having a concentration greater than 0.5%.

As used herein, the term "anhydrous" in the context of an electrolyte for an electrochemical cell means an electrolyte including a solvent other than water, water as a trace impurity having a concentration less than 0.5%.

As used herein, the term "drying" in the context of removal of water from a material, refers to removal of water to the greatest degree possible consistent with the drying process leaving water as a trace impurity at a concentration limited by the drying process actually used. Drying changes a material to an anhydrated state (therefore a dried material is an anhydrated material).

As used herein, the term "dehydrating" in the context of modifying a concentration of water in a material, refers to controllably reducing the moisture content to a desired level greater than a trace impurity. In contrast to drying, dehydrating contemplates retaining water as necessary desirable component of the material, for example, retaining coordinated water and removing non-coordinated water.

As used herein, the term "hydrating" in the context of modifying a concentration of water in a material, refers to controllably increasing the moisture content to a desired level greater than a trace impurity but less than an aqueous level for the material, for example, adding coordinated water without adding non-coordinated water, within target ranges.

As used herein, the term "mediating" in the context of modifying a concentration of moisture content in a coordination compound such as a TMCCC material includes dehydrating or hydrating the material to achieve a desired coordinated water concentration that enables the desired electrochemical properties without having unnecessary non-coordinated or other water content. Mediation of the water content quantity is intended to optimize towards zero or near-zero non-coordinated water without a loss of any of the coordinated water. One way to consider water content quantity mediation is consideration of a mass fraction of water of a TMCCC material, including non-coordinated and lattice-coordinated water, both before and after mediation.

Described herein is a new class of battery cell that is based on electrodes that contain transition metal cyanide coordination compound (TMCCC) materials. These TMCCC materials naturally contain water. Some of the water they contain is tightly bound within the crystal structure of the material, and some non-coordinated water may reversibly move in and out of the electrode as it is charged and discharged. Water that leaves the TMCCC material may then undergo chemical or electrochemical reactions with other cell components and thereby cause degradation of cell performance. One would therefore expect that removal of water from the TMCCC material would enhance electrode and cell performance by eliminating these undesirable reactions. However, total dehydration of a TMCCC material, including removal of the water that is tightly bound within the crystal structure, degrades the performance of the material. Embodiments of the present invention set the water content to a preferred level that includes enough for the crystalline structure while minimizing/reducing the non-coordinated water.

Figure 8:
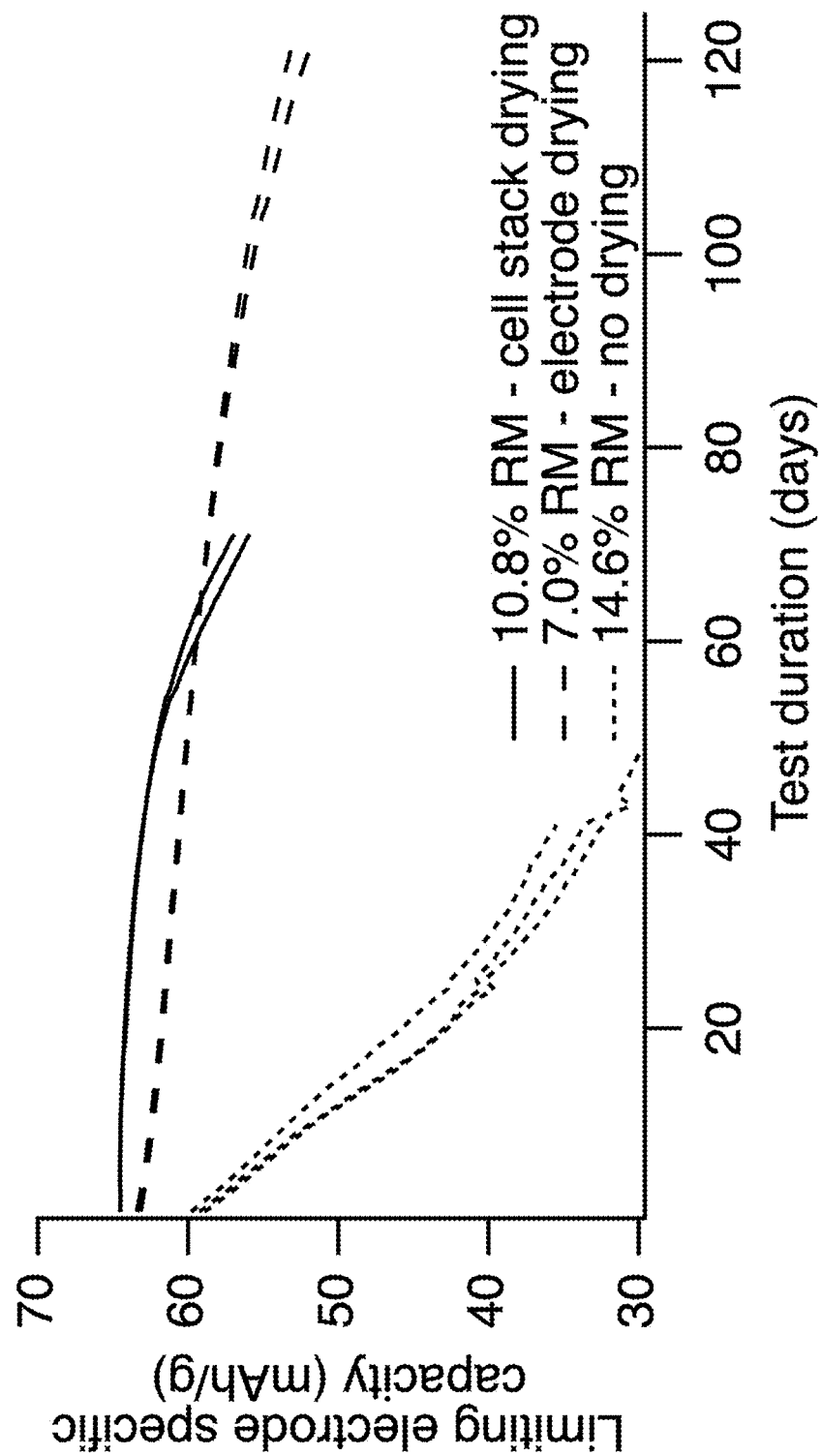
FIG. 8 illustrates a service life of full cells containing a sodium manganese hexacyanomanganate TMCCC anode and a sodium manganese iron hexacyanoferrate TMCCC cathode during float testing at 45° C.

The methods taught by Reference [2] have disadvantages both in efficacy and for the performance of the resulting battery cells. As shown in FIGS. 8-9 of Reference [2], a first drying step is performed after synthesizing the material (FIG. 8), thereby forming the water free (z=0) rhombohedral phase. Alternatively, the drying step may be performed after processing the material into an electrode (FIG. 9). TMCCC materials readily reabsorb water from the ambient surroundings, such as the humidity in the air in which they are stored. All processing steps after drying the TMCCC material to achieve the desired phase must be performed in a dry room, which adds cost and complexity to those steps. Therefore, to minimize the cost and complexity of fabricating a cell containing one or more TMCCC electrodes, the drying step should be performed after as many other processing steps as possible. Furthermore, in the case that a cell contains two TMCCC electrodes (the anode and the cathode), performing separate drying steps on each of those two materials, or on each of the two electrodes, is more complex than performing a single drying step on the assembled cell.

Disclosed herein is a simpler process for fabricating a cell containing two TMCCC electrodes would involve processing the TMCCC materials into electrodes, assembling those electrodes into a cell stack (a stack of anode electrodes, separators, and cathode electrodes), and then performing a single drying step on that cell stack, thereby drying both of the two electrodes at the same time. This is one embodiment of the present invention.

The performance of electrochemical cells containing TMCCC electrodes is dependent on the amount of water those electrodes contain. In opposition to the teachings of Reference [2] and Reference [3], some embodiments of the present invention illustrate that it is not necessarily the case that eliminating all water from a set of TMCCC electrodes will result in optimal cell performance. For example, the impedance of a TMCCC electrode increases as its RM is decreased by a more aggressive drying process. A higher electrode impedance degrades a cell's energy efficiency and power capability. Depending on the application for which a battery is used, different performance metrics matter more than other performance metrics. In the case of an application in which having a high energy efficiency is important, a nonzero RM in the TMCCC electrodes is optimal. On the other hand, as taught by Reference [2], in an application for which operating a battery cell in a narrow voltage range is important, drying the TMCCC electrodes to the point that they are "anhydrated" (RM=0) is desirable. The teachings of Reference [2] may, in a narrow range for specific applications and device requirements, offer better performance than RM maintained with the preferred non-zero range.

Embodiments of the present invention may include a process for partial or complete removal of non-coordinated water from the TMCCC structure, but not the removal of lattice-bound water. This dehydrating process may be performed on the individual TMCCC materials, or electrodes containing them, or it may be performed on a fully assembled cell stack. In some instances, the TMCCC material may have insufficient water for the lattice structure, therefore an aspect of the present invention allows for addition of water to meet the lattice needs without adding non-coordinated water.

A first advantage of some embodiments of the present invention is that by removing a controlled amount of non-coordinated water while leaving lattice-bound water in the material, the performance of the cell may be fully optimized for multiple performance metrics including energy efficiency, cycle life, and other metrics.

A second advantage of some embodiments of the present invention is related to the mechanical stability of the electrodes during the drying process. Drying a coated electrode to the point that is fully anhydrous requires prolonged exposure to a high temperature (typically >130° C.) and vacuum. Unfortunately, at high temperature the polymer binder contained in the porous electrode softens. This allows any stresses that have built up in the electrode during processing to be released, thereby resulting in the electrode deforming by curling up and losing its planarity. Subsequent processing steps such as electrode stacking require punched electrodes to be planar. A deformed or curled electrode is more difficult to process and may result in defects and/or yield losses. However, when the target RM of a TMCCC electrode is significantly above zero (about 4% or more) then less aggressive drying conditions are required (<100° C.) and less deformation of the electrode occurs during drying to the target RM. Furthermore, mechanical fixtures may be used to compress one or more electrodes or cell stacks so that a uniform temperature, rate of drying, and final RM is achieved. These mechanical fixtures may also provide mechanical stability to the electrodes or cell stacks. These fixtures therefore result in a consistent, homogeneous RM for large batches of tens or even hundreds of electrodes or cell stacks, which results in a higher quality product. Furthermore, these fixtures decrease or even eliminate the mechanical deformation that occurs during a drying process in which the electrodes or cell stacks are not mechanically constrained.

A third advantage of some embodiments of the present invention is that by drying to only an intermediate amount of RM that includes retaining all lattice-bound water, the drying step may be performed on a fully assembled cell stack. By performing drying on the full cell stack, fewer subsequent processing steps must be performed under a low RH atmosphere, thereby decreasing the cost and complexity of the electrode fabrication and cell assembly processes. Furthermore, in the case that the cell stack includes a separator that is Z-folded between the punched electrodes and optionally wrapped around the exterior of the cell stack, the mechanical rigidity provided by the separator limits the deformation and curling of the electrodes during drying. This decreases the risk of defects associated with electrode deformation and raises yield.

Embodiments of the present invention may include a method for drying TMCCC electrodes to an optimal RM at which one or more cell performance metrics reaches at optimal value. TMCCC materials have the general chemical formula $A_xP_y[R(CN)6-p(NC)p]z(H_2O)n$ where A is one or more mobile cation such as Li+, Na+, or K+, each of P and R is one or more transition metal cations in a 1+, 2+, 3+, or 4+ state, including but not limited to Cr, Mn, Fe, Ni, Cu, and Zn, and where H2O denotes a water molecule. The general chemical formula is typically normalized to y=1, and in that case typical compositions include $0 \le x \le 2$, $0.5 \le z \le 1$, $0 \le p \le 3$, and $0 \le n \le 4$. The water content of a TMCCC material may also be denoted on a percentage basis of the total mass of the material, in which case it is referred to as "residual moisture" (RM). For example, a sodium manganese iron hexacyanoferrate (MnFeHCF) TMCCC material having a formula Na1.4MnII0.8FeIII0.2[Fe(CN)6]0.9(H2O)2.6 has n=2.6 and RM=14.5%. The RM of a TMCCC may range from about zero to about 25% or more.

TMCCC materials have an open framework crystal structure in which hexacyanometallate groups of the formula R(CN)6-p(NC)p are octahedrally coordinated with the transition metal cations of species P. This structure may be configured in a cubic phase, or less commonly, a rhombohedral or monoclinic phase. For non-cubic phases, the R—CN—P bonds are shifted off-axis from one another, whereas in a cubic phase, the R—CN—P bonds for a straight line along the same axis.

The TMCCC structure contains large interstitial sites in which mobile cations A+ and water may reside. As the A+ cations are not strongly bound to the lattice, they may readily exit and reenter the structure during electrochemical cycling of the TMCCC material. Similarly, non-coordinated water may reversibly exit and reenter the TMCCC material. Removal of non-coordinated water may be performed by exposing a TMCCC material to a low ambient relative humidity (RH), by heating the material, by applying a vacuum to the material, by electrochemically or chemically inserting additional A+ cations into the material (and therefore occupying interstitial space that would otherwise be occupied by water molecules), or a combination of these or other processes. Regardless of the specific method of drying, water will leave the TMCCC material until an equilibrium RM is reached. Conversely, exposure of a "dry" TMCCC material that has a low RM to moisture, either by contacting liquid water, or by exposure to an atmosphere having a high RH will result in the material absorbing water until a new equilibrium is reached at a higher RM. For many TMCCC materials, removal of non-coordinated water may be easily performed by drying the material in air or under vacuum at temperatures of 60-130° C.

TMCCC materials also contain water that is bound to the framework structure. The most common configuration of bound water is water coordinated to a P site cation adjacent to a hexacyanometallate vacancy (for the case of z<1). The presence of that vacancy includes an absence of CN groups, and therefore a vacancy in the coordination shell of each of the adjacent P site cations. Syntheses of TMCCC materials are typically performed in water, allowing ambient water molecules to bind to P cations to fill out vacancies in their coordination shells resulting from hexacyanometallate vacancies.

Consider an example of lattice-bound water, in which a center of a TMCCC structure is missing a R(CN)6 group, and the adjacent six P site cations are each coordinated to one water molecule. In such a TMCCC material, non-coordinated water, which may or may not coordinate to an interstitial sodium ion, as well as lattice-bound water, in which the P site cations adjacent to a R(CN)6 vacancy each have one water molecule bonded to them. Should the lattice-bound water be removed via an aggressive drying process, those P site cations would be unstable because their coordination shells are no longer full. This results in a less stable structure and degradation of the performance of the TMCCC electrode.

TMCCC materials are able to be processed into composite battery electrodes in a number of ways. These composite battery electrodes may also include one or more conductive additives such as carbons, and one or more polymer binders.

This general process involves the mixing of the TMCCC with the carbons and binders in one or more organic solvents to form a viscous slurry or ink that may be coated onto a substrate. That mixing may be performed at low or high shear rates to optimize the dispersion of the TMCCC, carbon, and binder in the solvents. After mixing, the resulting slurry may be coated onto a substrate such as a mesh or foil. Those substrates may be metal such as aluminum, copper, or stainless steel, or surface-modified metal such as carbon-coated aluminum. Coating may be performed using a blade-over-roll coater, a slot-die coater, an extrusion coater, or another type of coater. After coating, the coated substrate is dried by one or more of the following: convective heating, infrared heating, convective airflow, or another drying process. The result of the drying process is a composite electrode on the substrate. The drying step performed after coating to form the composite electrode is for the primary purpose of evaporating the solvents present in the slurry. This drying step may optionally decrease the RM of a TMCCC material present in the coated electrode.

That composite electrode may then be densified using a roll press such as a calender press. Variations of this electrode preparation process may be used to achieve enhanced electrode performance. These variations may include selection of various conductive carbons or combinations of conductive carbons including but not limited to carbon black, graphite, or hard carbon, or selection of various binders or combinations of binders including but not limited to vinylfluoride/hexafluoropropylene copolymer, polyvinylidenefluoride (PVDF), polyacrylonitrile, polymethylmethacrylate, polytetrafluoroethylene, or styrene butadiene rubber-based polymer. Variations of this electrode preparation process may also include the temperature, duration, and pressure during electrode drying.

A drying process may be performed on a TMCCC material including a first RM. The drying process may include heating, exposure to vacuum, or both. A drying temperature of less than 130° C., and preferably less than 100° C., is desired to selectively remove non-coordinated water but not lattice-bound water. The drying process may also be performed using a combination of heating and exposure to vacuum, where a vacuum is defined as an ambient pressure less than 1 bar, and preferably less than 0.1 bar. The drying process results in a decrease in the RM of the electrodes to a value less than its first RM, typically to a second RM of about 1% to about 10%. The rate at which drying proceeds from the first RM to the second RM depends on both the temperature and vacuum pressure. It may be advantageous to perform drying at a relatively slow rate at a temperature of less than 100° C. so that the drying process may be stopped at a well-controlled second RM. In this scenario, drying may be performed for a duration of ten minutes to one hour, or one hour to ten hours, or ten to twenty hours. Drying of a TMCCC material for a duration of approximately one hour or more, and preferably ten hours or more, results in a homogeneous drying process: all of the particles of TMCCC material in the sample reach the same RM, and the water within those particles may be distributed homogeneously. Prolonged exposure of a TMCCC material to temperatures of 100° C. or more for a duration of twenty hours or more may result in chemical instability and undesired chemical reactions. Therefore, drying to a desired second RM should be performed at a rate slow enough to enable homogeneous drying to a precise second RM, but not at a rate so slow that undesirable chemical reactions may occur. These considerations in drying rate also apply to the vacuum pressure applied during drying. The stronger the vacuum, the faster drying will occur at any specific temperature. Therefore, the vacuum pressure should be selected in combination with a drying temperature to achieve the desired rate and homogeneity of drying and the desired RM. These considerations apply not only for processes in which a drying process is performed on a TMCCC material, but also for processes performed on one or more electrodes containing one or more TMCCC materials, or on a cell stack containing one or more such electrodes.

A drying process may be performed on electrodes including one or more TMCCC materials, each of which includes a one or more first RM, before they are assembled into a cell stack. The drying process may include heating, exposure to vacuum, or both. For an electrode containing a TMCCC material, temperatures of less than 130° C., and preferably less than 100° C., are desired to allow removal of non-coordinated water but not lattice-bound water. This results in a decrease in the RM of the electrodes to a value less than its initial RM, typically to a second RM of about 1% to about 10%. Composite electrodes containing polymer binders are typically calendered to decrease their porosity to a desired value. Doing so enables batch-to-batch control of electrode porosity, density, and thickness so that a reliable, high quality cell design can be manufactured. However, calendering involves mechanical deformation of the electrode that may induce stresses internal to the composite layers. When a polymer is heated, its Young's modulus and yield strength decrease. During the heating associated with an electrode drying process, this weakening of the polymer binder may allow stresses to be released through deformation of the electrode. One type of deformation of the electrode is curling, in which the edges of a formerly planar porous electrode curl towards one another. Curling may be irregular, making the assembly of a cell stack from curled electrodes challenging and prone to defects. To decrease electrode curling, a stack of one or more punched electrodes may be placed between two compression plates. These plates restrict deformation of the electrodes during the drying process. By preventing curling and by maintaining a planar configuration of each of the electrodes, each of the electrodes is exposed to the same drying conditions (temperature and local vacuum pressure) so a homogenous RM may be achieved for all of the electrodes present during the drying process. The electrodes may further by separated from one another by a thin spacer made of a sheet of metal, plastic, or another material that flat and chemically inert under the drying conditions (temperature and vacuum pressure). These dried electrodes may then be assembled into cells by using standard processing steps such as stacking of one or more anode electrodes, separators, and cathode electrodes to form a cell stack. To ensure that the electrodes do not reabsorb water to attain a third RM greater than the second RM achieved at the end of the drying process, each following processing step should be performed under a low, controlled RH until the cell stack is sealed in an impermeable cell package.

A cell stack may be assembled by placing one or more layers of anode electrodes, separators, and cathode electrodes into a multilayer stack. These one or more layers may be ordered such that a separator is placed between each of the electrode layers, and furthermore, such that every other electrode layer is either an anode or a cathode. The result of this stacking process may be an ordering of layers such as " . . . anode, separator, cathode, separator, . . . " such that a separator placed in between two electrodes is adjacent to both one anode electrode and one cathode electrode. The first and last layers in the stack may be electrodes of the same or opposite types, or they may be separators, or they may be an electrode and a separator. Discrete electrode and separators may be placed next to one another to form a stack of multiple layers (see figure). Alternatively, a single long separator may be folded or woven back-and-forth between alternating anode and cathode electrodes (see figure).

After a cell stack is assembled, a first tab will be attached to the one or more anode layers, and a second tab will be attached to the one or more cathode electrodes. These tabs are typically designed to protrude outside of the cell's packaging so that an electronic contact to the cell may be made. The tab attachment processes may be performed by ultrasonic welding, electronic spot welding, laser welding, chemical bonding with an electronically conductive adhesive, or by one or more other processes that result in intimate contact and electronic conductivity between the tab and one or more electrodes. After attaching the tabs, the cell stack may be placed in a package that is impermeable to air, water, or other chemical contaminates. One or more liquid electrolytes may be placed in a package with the cell stack. After all internal cell components are placed within the packaging, the packaging is sealed. The packaging may include a multilayer polymer/metal laminate, a metal can or box, or a metal can or box that is lined with an electronically insulating layer, or another type of packaging material that is impermeable to water and air. The packaging may be sealed by performing a heat-sealing process, a laser welding process, or one or more other sealing processes. The sealing process may be performed such that the only components of the cell extending from the inside of the packaging to the outside of the packaging are the two tabs.

Critically, to maintain a desired second RM for a quantity of one or more electrodes, each of the subsequent processing steps until the sealing of the cell packaging must be performed under a controlled, low RH. In the case that the one or more electrodes, or one or more cell stacks is exposed to an uncontrolled or high RH, they may reabsorb water, thereby resulting in a third RM greater than the desired second RM. The process requirement of including a controlled, low RH may add to the cost and complexity of a manufacturing process, or it may decrease the throughput or yield of that process.

A drying process may also be performed on cell stacks containing one or more anode electrodes, separators, and cathode electrodes. This cell stack drying process may be performed on cell stacks containing electrodes that were previously dried to reach a desired second RM as described above, or on cell stacks containing electrodes that were not previously dried. The electrodes present in a cell stack may have been calendered before the stack was assembled and may include a deformation and internal stress. Therefore, performing a drying process on a cell stack in the absence of mechanical constraints may result in curling of the electrodes within the cell stack. This curling of the electrodes within the cell stack may be greater than, approximately equal to, or less than the curling that occurs during drying of one or more unconstrained electrodes (as described above). To minimize or eliminate curling of the electrodes within a cell stack during drying to a desired second RM, one or more cell stacks may be mechanically constrained between two compression plates. Spacers may optionally be placed between the cell stacks. By mechanically constraining the cell stacks, curling of the electrodes may be eliminated and a planar configuration to the electrodes is maintained. This allows for a consistent drying process in which a homogeneous second RM is achieved for each of the anodes and cathodes in each of the cell stacks.

A change in the RM of a one or more anode electrodes may be denoted as $\Delta RM(a)$, where $\Delta RM(a)$ is equal to the difference between a first RM, denoted as $RM(a1)$, and a second RM, denoted as $RM(a2)$: $\Delta RM(a)=RM(a1)-RM(a2)$. Similarly, a change in the RM of a one or more cathode electrodes may be denoted as $\Delta RM(c)$, where $\Delta RM(c)$ is equal to the difference between a first RM, denoted as $RM(c1)$, and a second RM, denoted as $RM(c2)$: $\Delta RM(a)=RM(c1)-RM(c2)$. As stated above, a first RM such as $RM(a1)$ or $RM(c1)$ depends on the composition of the TMCCC material and the conditions in which it reaches an equilibrium, such as RH and temperature. A second RM such as $RM(a2)$ or $RM(c2)$ depends on the one or more conditions of a drying process, such as the temperature, vacuum pressure, and duration.

When each of $RM(a1)$ and $RM(c1)$ are greater than each of $RM(a2)$ and $RM(c2)$, or in other words, when $RM(a1)$, $RM(c1)>RM(a2)$, $RM(c2)$, then each of $\Delta RM(a)$ and $\Delta RM(c)$ are greater than zero. In this case, a net quantity of water is removed from both the one or more anodes and the one or more cathodes, resulting in a net decrease in water for the entire cell stack. This cell stack drying process is therefore equivalent to a cell manufacturing process including separate electrode drying processes including a first number of one or more anode electrodes is dried to $RM(a2)$ in a first process, and including a second number of one or more cathode electrodes is dried to $RM(c2)$ in a second process, followed by stacking to form a cell stack under a low, controlled RH. Performing a single drying process on fully assembled cell stacks may therefore enable a single process to be performed and may eliminate the process requirement of low, controlled RH for cell assembly steps performed between electrode drying and the sealing of cell packages.

When a cell stack drying process is performed under conditions such that $RM(a1)<RM(a2)<RM(c2)<RM(c1)$, then a net quantity of water may be removed from the cell stack, and some water may be transferred from the one or more anodes to the one or more cathodes. Similarly, if a cell stack drying process is performed under conditions such that $RM(c1)<RM(c2)<RM(a2)<RM(a1)$, then a net quantity of water may be removed from the cell stack, and some water may be transferred from the one or more cathodes to the one or more anodes. Reaching a desired $RM(a2)$ and $RM(c2)$ through a combination of a transfer of water between the one or more anodes and one or more cathodes requires a smaller total net water loss from the electrodes. In a case in which a smaller total net water loss is required to achieve one or more second RMs, the one or more drying processes may be performed at a lower temperature, at a less intense vacuum pressure, for a shorter duration, or with one or more other decreases in the intensity, cost, or complexity of said drying processes.

When $RM(a2)$ and $RM(c2)$ are reached under the same drying conditions and with the one or more anodes and one or more cathodes in communication with one another, then $RM(a2)$ and $RM(c2)$ are in equilibrium with one another. If $RM(a2)$ and $RM(c2)$ are in equilibrium with one another, then there is no thermodynamic driving force for water to move from one type of electrode to the other. If the cell assembly processing steps subsequent to the cell stack drying process are performed such that $RM(a2)$ and $RM(c2)$ do not change, then they may remain in equilibrium with one another throughout these drying processes, and furthermore, during operation of the cell. If $RM(a2)$ and $RM(c2)$ remain in equilibrium with one another during operation of the cell, then water may not be released from one or more of the electrodes to undergo undesirable chemical or electrochemical reactions. Therefore, performing drying on cell stacks, rather than on individual electrodes, may result in an improvement in the performance of the cell.

EXAMPLES

For each of the examples below, a porous electrode containing a TMCCC material was fabricated by first mixing TMCCC powder, nanoparticulate carbon black powder, and a styrene-butadiene binder in a mass ratio of approximately 85:7.5:7.5 in a solution of xylenes and butyl alcohol to form a viscous slurry. This slurry was coated onto an aluminum foil substrate using a slot die coater to form a coated electrode having a target solids mass loading of approximately 20 mg/cm2. This coated electrode was heated at a temperature no greater than 100° C. for 10 minutes to remove the organic solvents, thereby forming a dried electrode having a first porosity of over 50%. The dried electrode was then calendered to a second porosity of less than 30% to form a porous electrode. The porous electrode was then punched into sheets of desired dimensions ranging from about 2 by 2 cm to about 20 by 20 cm for use in battery cells having various form factors, resulting in the formation of punched anode electrodes.

1. Monolayer Electrode Drying

Anodes and cathodes can be dried at the electrode level to achieve optimal RM.

Example 1

Anode electrodes were prepared. The as-prepared anodes contained a first RM of 9.1%, as measured using a Karl Fischer volumetric titrator. Six 15 cm2 anode electrodes were placed flat, in a monolayer fashion, on the center shelf of a vacuum oven that was previously preheated to 70° C. The vacuum oven was evacuated, and the electrodes were dried under dynamic vacuum for 20 minutes, achieving a final pressure of 0.67 torr in the vacuum oven after 20 minutes. The oven was then refilled with nitrogen and the anode electrodes were removed from the oven. The dried anodes contained a second 7.1% RM based on the mass of the electrode composite, as measured using a Karl Fischer volumetric titrator.

Example 2

Cathode electrodes were prepared. The as-prepared cathodes contained a first RM of 18.2%, as measured using a Karl Fischer volumetric titrator. Six 15 cm2 cathode electrodes were placed flat, in a monolayer fashion, on the center shelf of a vacuum oven that was previously preheated to 110° C. The vacuum oven was evacuated, and the electrodes were dried under dynamic vacuum for 60 minutes, achieving a final pressure of 0.37 torr in the vacuum oven after 60 minutes. The oven was then refilled with nitrogen and the cathode electrodes were removed from the oven. The dried cathodes contained a second 6.9% RM, as measured using a Karl Fischer volumetric titrator. The dried anode and cathode electrodes were then stacked into a cell within a moisture-controlled environment. The resulting cell exhibited optimal performance.

The following is a general paragraph about this type of drying as used to prepare the data shown in FIGS. 1-4.

Anodes are typically dried at a temperature within the range of 60° C.-100° C. while cathodes, which naturally contain more water than anodes, are typically dried within the range of 100° C.-120° C. One must be mindful not to dry at such a high temperature that the electrode or active material will thermally degrade. As such, it is important to understand the thermal properties of the electrode components before developing a drying method. For both electrodes, the drying duration is typically in the range of 20 minutes-2 hours. For both electrodes, the final achieved pressure of the vacuum oven during drying is typically in the range of 0.2-1.0 torr. The RM of the undried electrode, the residual slurry solvent content in the undried electrode, and the vapor pressures of the aforementioned volatiles will greatly impact the drying temperature and duration needed to achieve each electrode's optimal RM. These factors may change depending on the synthesis conditions of the powder, the slurry composition and the coating and drying conditions of the slurry. Additionally, the drying batch size, or the total mass of electrodes in the vacuum oven during one drying cycle, will alter the drying temperature and duration needed to achieve optimal RM.

2. Powder Drying

An alternative route to achieving the optimal RM in the final product is to perform the drying step upstream from the electrode—at the powder level.

Example 1

Anode powder was synthesized. The as-synthesized anode powder contained a first RM of 8.7%, as measured by a Karl Fischer volumetric titrator. 20 grams of anode powder was spread in a glass dish and covered by a Kim wipe that was secured to the glass container using a rubber band. The glass container was placed in the center shelf of a vacuum oven that was preheated to 70° C. The anode powder was dried under dynamic vacuum for 16 hours. The dried anode powder contained a second RM of 7.1%, as measured by a Karl Fischer volumetric titrator.

Example 2

Cathode powder was synthesized. The as-synthesized cathode powder contained a first RM of 16.3%, as measured by a Karl Fischer volumetric titrator. 20 grams of cathode powder was spread in a glass dish and covered by a Kim wipe that was secured to the glass container using a rubber band. The glass container was placed in the center shelf of a vacuum oven that was preheated to 100° C. The cathode powder was dried under dynamic vacuum for 16 hours. The dried cathode powder contained a second RM of 7.0%, as measured by a Karl Fischer volumetric titrator.

Comments on Post-Powder Drying Processes:

The dried powders were then mixed into slurries with a conductive additive and binder to be coated into electrode sheets. The formulation of the slurry was adjusted to account for different rheology behavior of the dried powders, compared to their typical undried state. The coated electrodes were then dried at low temperature to evaporate the slurry solvent. The resulting electrodes contained the optimal moisture content, and needed no additional vacuum drying. The electrodes were then stacked into cells that exhibited optimal performance. This route of drying requires that all subsequent processing steps after vacuum drying the powder be done in a moisture-controlled environment such that the dried powder remains in the optimal RM condition and does not re-absorb moisture from the processing environment.

3. Stacks of Electrodes Drying Process—General Examples

Example 1: electrode drying. Stacks of electrodes containing between 5-30 pieces are prepared and weighed.

Electrodes are dried in a vacuum oven under dynamic vacuum for 90 to 480 minutes at a temperature which is between 80 to 120° C., according to the material, batch size, and desired target remaining moisture.

Example 2: electrode drying. Stacks of electrodes of not more than 30 pieces are loaded in a vacuum oven and preheated plates weighing not less than 2 pounds each are placed on the electrode stacks. Electrodes are dried under dynamic vacuum at a temperature of 80-120° C. for a duration of 90 to 480 minutes, according to the material, batch size and desired remaining moisture of the material.

It may be advantageous to apply pressure or constrain the electrodes in stacks to improve the uniformity of the heat transfer in stacks with multiple electrodes. This can be accomplished through the use of a heavy plate of similar surface area to the electrodes, or via a fixture whereby electrodes are placed between plates which are bolted together to provide a desired amount of pressure.

Electrodes may equivalently be dried in a vacuum oven or in a convection oven under inert atmosphere such as nitrogen.

Example 3: electrode drying. Electrodes including a first RM1 >13.4% are dried in a vacuum oven at 120° C. under dynamic vacuum for a duration of 360 to 600 mins, depending on batch size, to a second RM2 of <6.7%. Electrodes are subsequently stacked into cells under a controlled RH of <10%. Measurements taken after cell stacking show these electrodes have reached third RM3 between 6.7% and 7.2%, where RM3>RM2, and RM3 is the desired final material moisture.

Example 4: electrode drying. Electrodes are placed into a convection oven at a temperature of 80-120° C., and the oven is purged with N2 at a rate up to 150 SCFM during drying. Electrodes are dried for 50-90 mins, depending on the material, batch size and desired remaining moisture.

4. Stacks of Electrodes Drying Process—Specific Examples

Example 5: cathode electrode drying. The residual moisture of cathode electrodes including a sodium manganese iron hexacyanoferrate TMCCC material was measured using Karl Fischer to be 18.4% of the mass of the electrode composite. Eight stacks of 14 cathode electrodes, with an area of approximately 385 cm2, were placed horizontally and evenly spaced on two shelves of a vacuum oven. These stacks were covered with aluminum plates of approximately 500 g. Both ovens and plates were preheated to 120° C. Electrodes were dried for 6 hours under active vacuum. The final moisture was measured by Karl Fischer to be 7.0% of the mass of the electrode composite.

Example 6: anode electrode drying. The residual moisture of anode electrodes including a sodium manganese hexacyanomanganate TMCCC material was measured using Karl Fischer to be 8.1% of the mass of the electrode composite. Eight stacks of 12 anode electrodes, with an area of approximately 369 cm2, were placed horizontally and evenly spaced on two shelves of a vacuum oven. These stacks were covered with aluminum plates of approximately 500 g. Both ovens and plates were preheated to 80° C. Electrodes were dried for 80 minutes under active vacuum. The final moisture was measured by Karl Fischer to be 7.1% of the mass of the electrode composite.

Cell Drying Process—General Examples

Example 7: cell drying. Cells, comprised of stacked anode and cathode electrodes interspersed with separator and placed inside of unsealed laminate packaging, may be arranged in a monolayer or may be stacked 2-3 cells high and dried in a vacuum oven. The cells are dried under dynamic vacuum at a temperature of 95° C. for 60-120 mins, depending on batch size and desired target remaining moisture.

It may be advantageous to dry stacked cells as a unit, rather than drying individual electrodes or a number of anode electrodes or cathode electrodes, either to improve the efficiency, yield, or cost of the drying process and downstream processes (collectively, manufacturing considerations), or to reach desired final RM.

It may be advantageous, for manufacturing considerations, or to reach desired final RM, to pre-dry the one or more anode or cathode electrodes prior to cell assembly, and then to subsequently dry the fully assembled cell stack. In certain cases, one electrode may be pre-dried from first RM to a second RM and during the cell drying step, to a further third RM, which may be greater or less than the second RM, due to the transfer of moisture between anode and cathode electrodes during the cell drying step. In this way, the final moisture targets of both electrodes can be designed and achieved through complementary drying steps.

Furthermore, it may be advantageous, due to manufacturing considerations, or desired final material moisture to choose a drying condition that removes more water from the electrode materials than the desired final target, in anticipation of moisture reabsorption during subsequent processing steps.

5. Cell Drying Process—Specific Examples

Example 8: cell drying. A lot of 8 stacked cells in unsealed laminate pouches were prepared. Prior to drying, representative electrode samples were measured with Karl Fischer. The cathodes were found to have a first RM, RMc(1) of 18.4% and the anode was found to have a first RM, RMa(1) of 8.1%. The cells were loaded into a vacuum oven and covered with aluminum compression plates weighing approximately 500 g. Both the oven and plates were preheated to 90° C. Cells were dried under active vacuum for 90 mins before removal from the oven. A cell was disassembled, and samples taken for Karl Fischer moisture measurements. A second RM of the electrodes was measured. For the cathode, a second RMc(2) was measured to be 14.0% and for the anode, a second RMa(2) was measured to be 5.8%. A net decrease in RM was observed for each of the two electrodes.

6. General Concepts for Examples:

1. Equipment Set-Up

The drying system consists of a vacuum oven that is connected to a vacuum pump, with a solvent trap along the vacuum line between the oven and the pump. A digital pressure gauge is used to precisely monitor the pressure achieved in the vacuum oven during drying. Before drying, the oven should be preheated and stabilized to the desired temperature, and the solvent trap must be pre-frozen. Under full vacuum with a pre-frozen solvent trap and pre-heated oven, a pressure of <0.2 torr should be achieved when the oven is empty. This confirms that all seals in the system are acceptable.

2. Re-Absorption

Dried electrodes are very hygroscopic and tend to re-absorb moisture from their environment. Particularly, electrodes may re-absorb moisture from humidity in the air, or they may absorb moisture from another electrode, when coming into contact with that electrode during cell stacking.

It may be advantageous to pre-dry electrodes to a moisture that is below the optimal RM, in anticipation of the electrodes re-absorbing moisture from humid air during downstream processes.

It may be advantageous to dry one set of electrodes to moisture a<b where moisture b is the optimal RM for that electrode set (anode or cathode), and then stack that set of electrodes into a cell where the other electrodes have moisture x>y where y is the optimal RM for that set of electrodes (anode or cathode). The moisture transfer between electrodes during cell stacking can bring both sets of electrodes to their optimal RM's b and y. If moisture transfer from cell stacking is insufficient, subsequent drying of the cell stack can enhance the moisture transfer between electrode sets.

Figure 2:
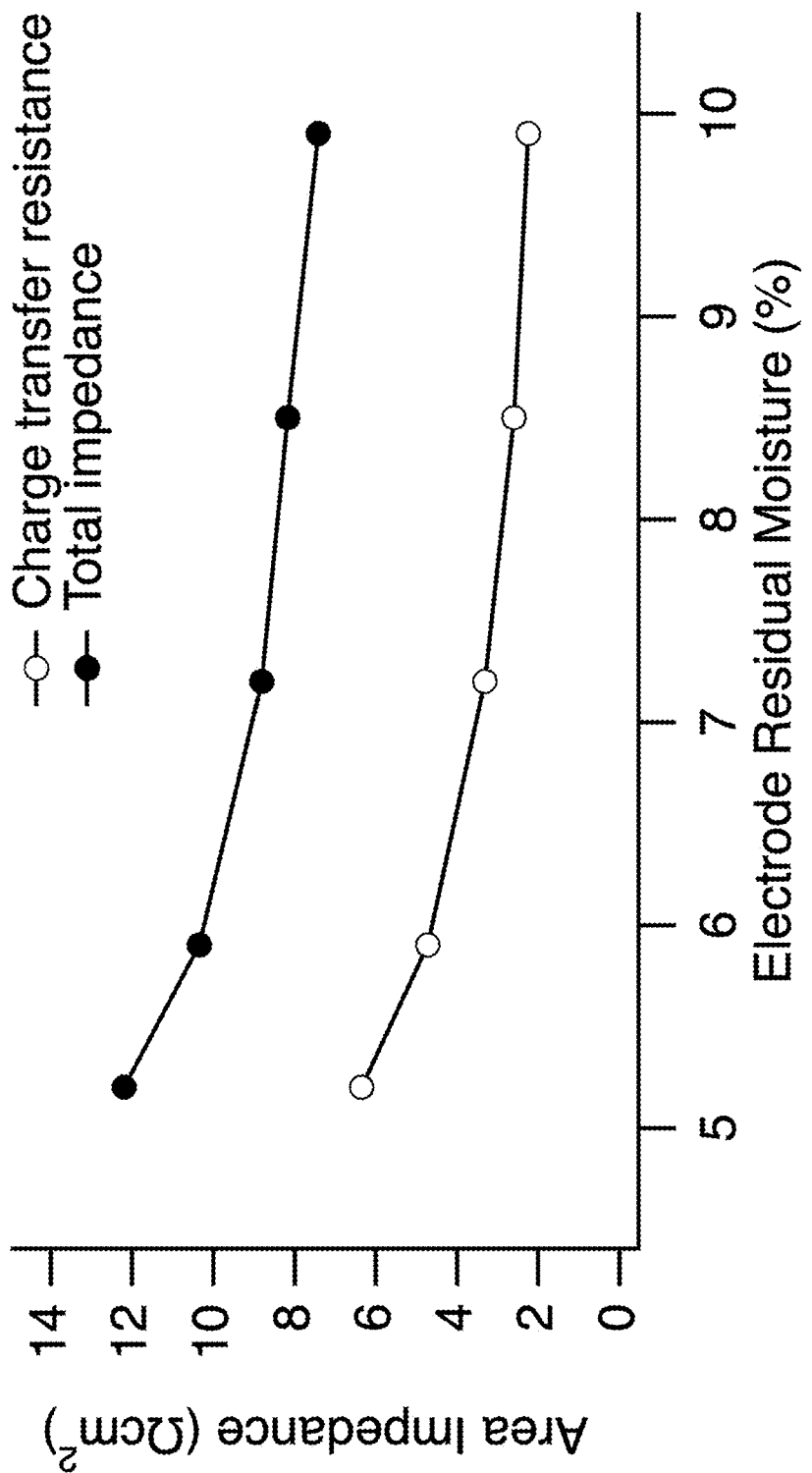
FIG. 2 illustrates a total impedance and charge transfer resistance of electrodes containing a sodium manganese hexacyanomanganate TMCCC anode material as a function of the residual moisture of the electrodes after drying.
Figure 3:
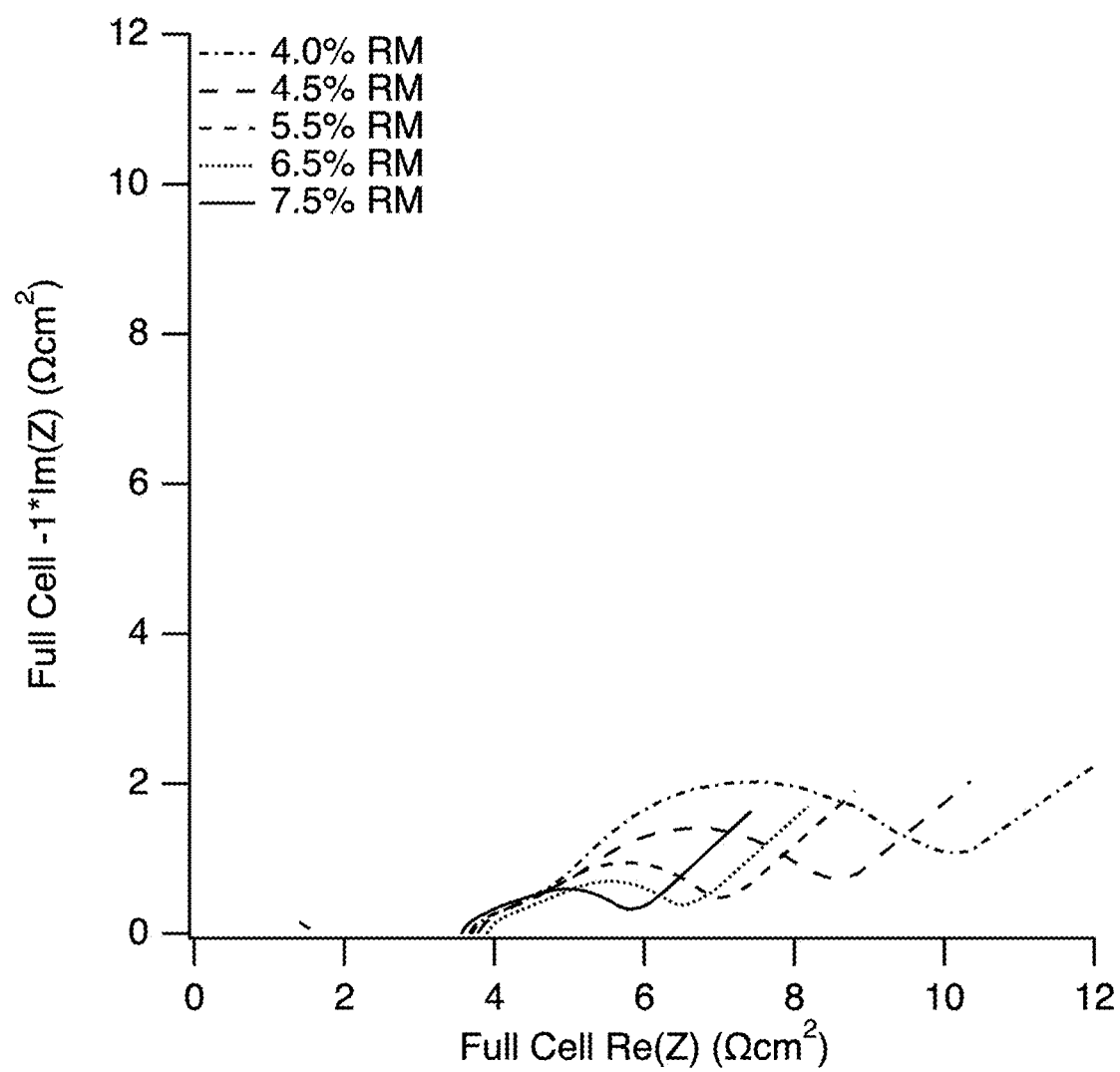
FIG. 3 illustrates an electrochemical impedance spectra of electrodes containing a sodium manganese hexacyanomanganate TMCCC anode material as a function of the residual moisture of the electrodes after drying.
Figure 4:
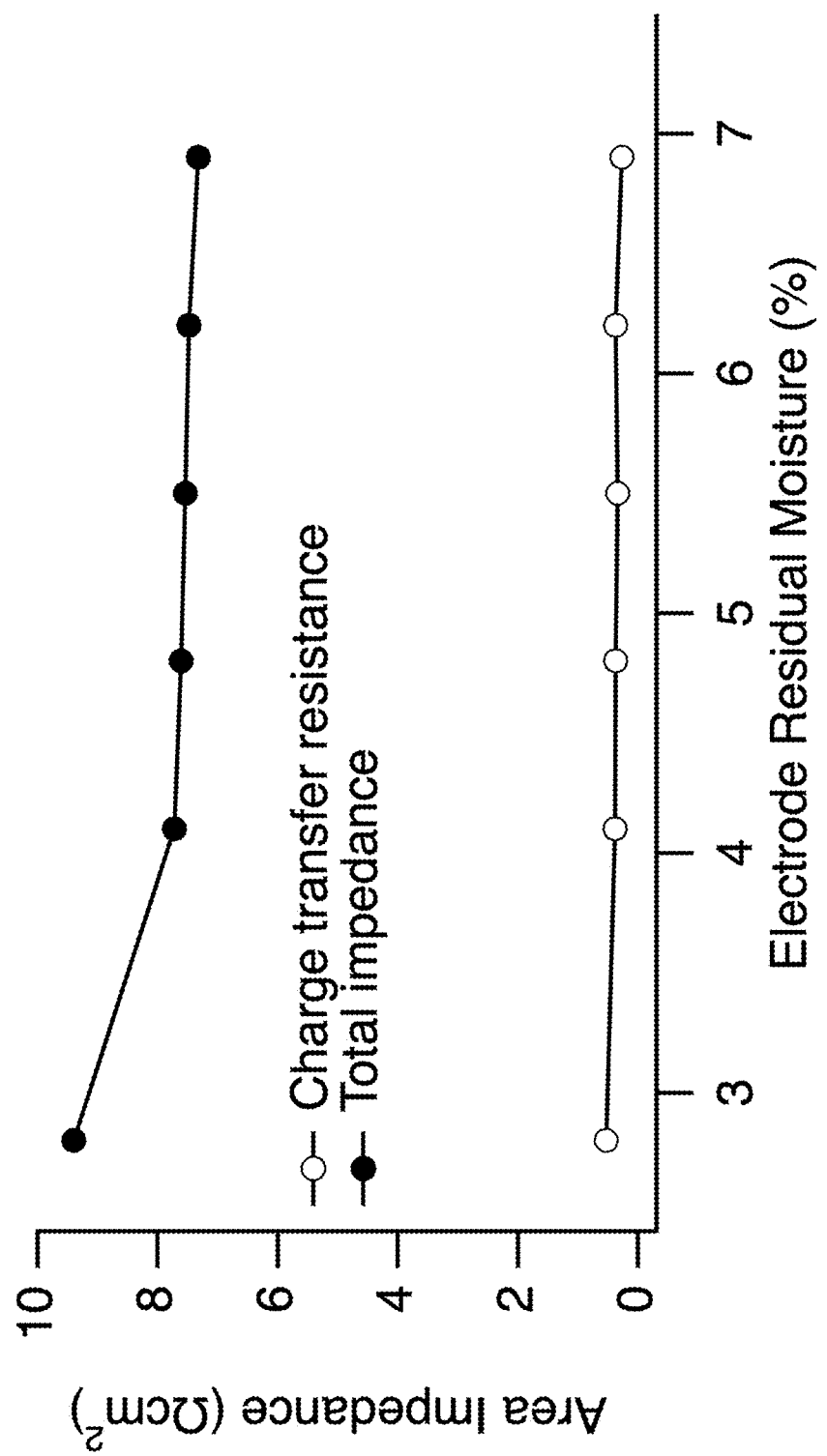
FIG. 4 illustrates a total impedance and charge transfer resistance of electrodes containing a sodium manganese iron hexacyanoferrate TMCCC cathode material as a function of the residual moisture of the electrodes after drying.

FIG. 1 illustrates a specific capacity of electrodes containing a sodium manganese hexacyanomanganate TMCCC anode material as a function of the residual moisture of the electrodes after drying;

FIG. 2 illustrates a total impedance and charge transfer resistance of electrodes containing a sodium manganese hexacyanomanganate TMCCC anode material as a function of the residual moisture of the electrodes after drying;

FIG. 3 illustrates an electrochemical impedance spectra of electrodes containing a sodium manganese hexacyanomanganate TMCCC anode material as a function of the residual moisture of the electrodes after drying;

FIG. 4 illustrates a total impedance and charge transfer resistance of electrodes containing a sodium manganese iron hexacyanoferrate TMCCC cathode material as a function of the residual moisture of the electrodes after drying;

FIG. 1-FIG. 3 show that the specific capacity of the anode electrodes decreases for dryer, lower RM electrodes. In addition, the total impedance and the charge transfer resistance increase for dryer, lower RM anodes. This shows that the lower the RM, the greater the degradation in performance of the anode electrodes.

FIG. 4 shows that the total impedance and charge transfer resistance increase for dryer, lower RM cathodes. The onset of performance degradation, as evidenced by an increase in total impedance and charge transfer resistance, occurs below 3% RM for the cathodes, and below 7% for the anodes. This shows that the drying conditions to optimize the performance of a TMCCC electrode depend on the composition of the TMCCC material the electrode contains.

Figure 5:
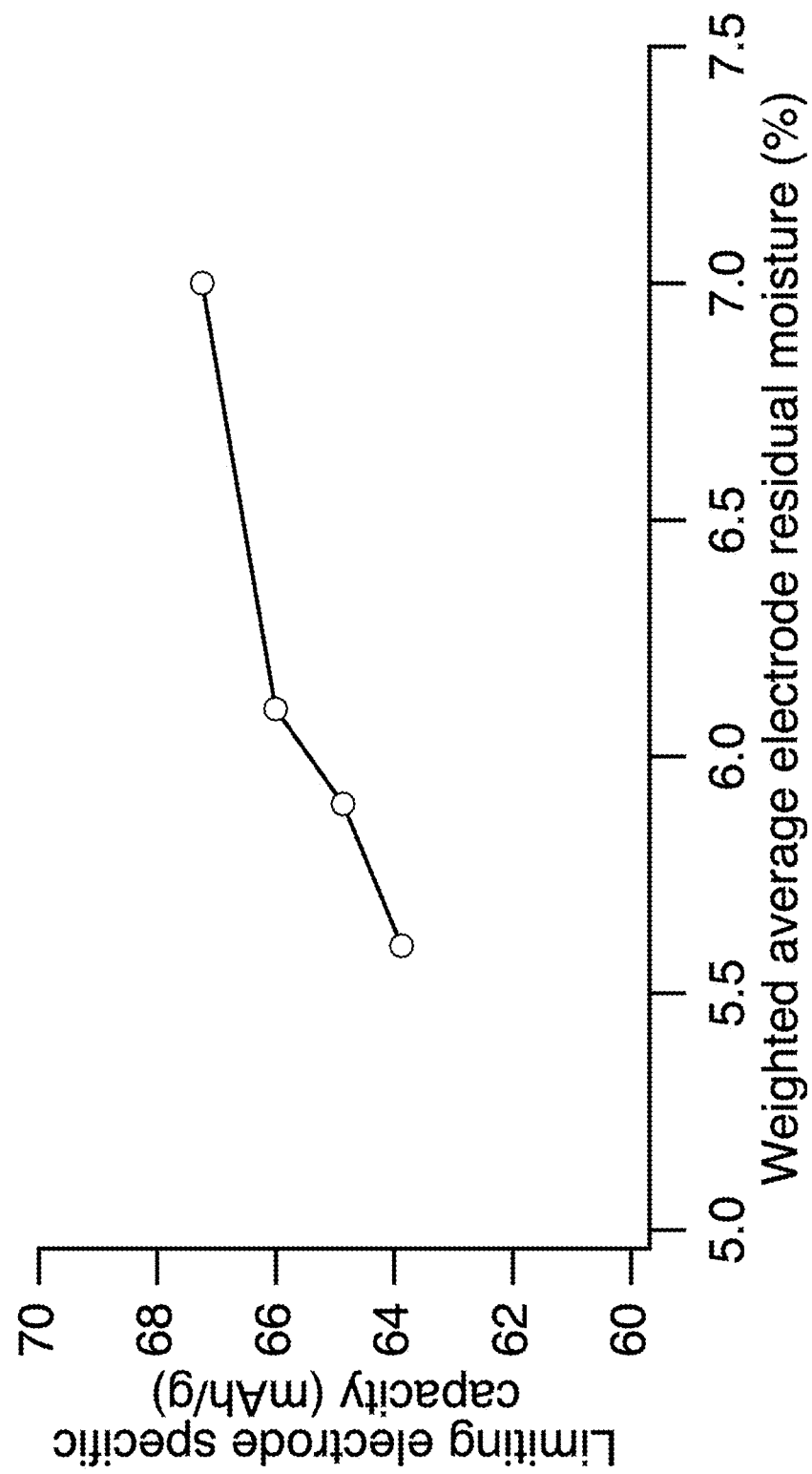
FIG. 5 illustrates a specific capacity of the capacity-limiting electrode of a full cell containing a sodium manganese hexacyanomanganate TMCCC anode and a sodium manganese iron hexacyanoferrate TMCCC cathode—the capacity decreases as the weighted average residual moisture of the two electrodes decreases.
Figure 6:
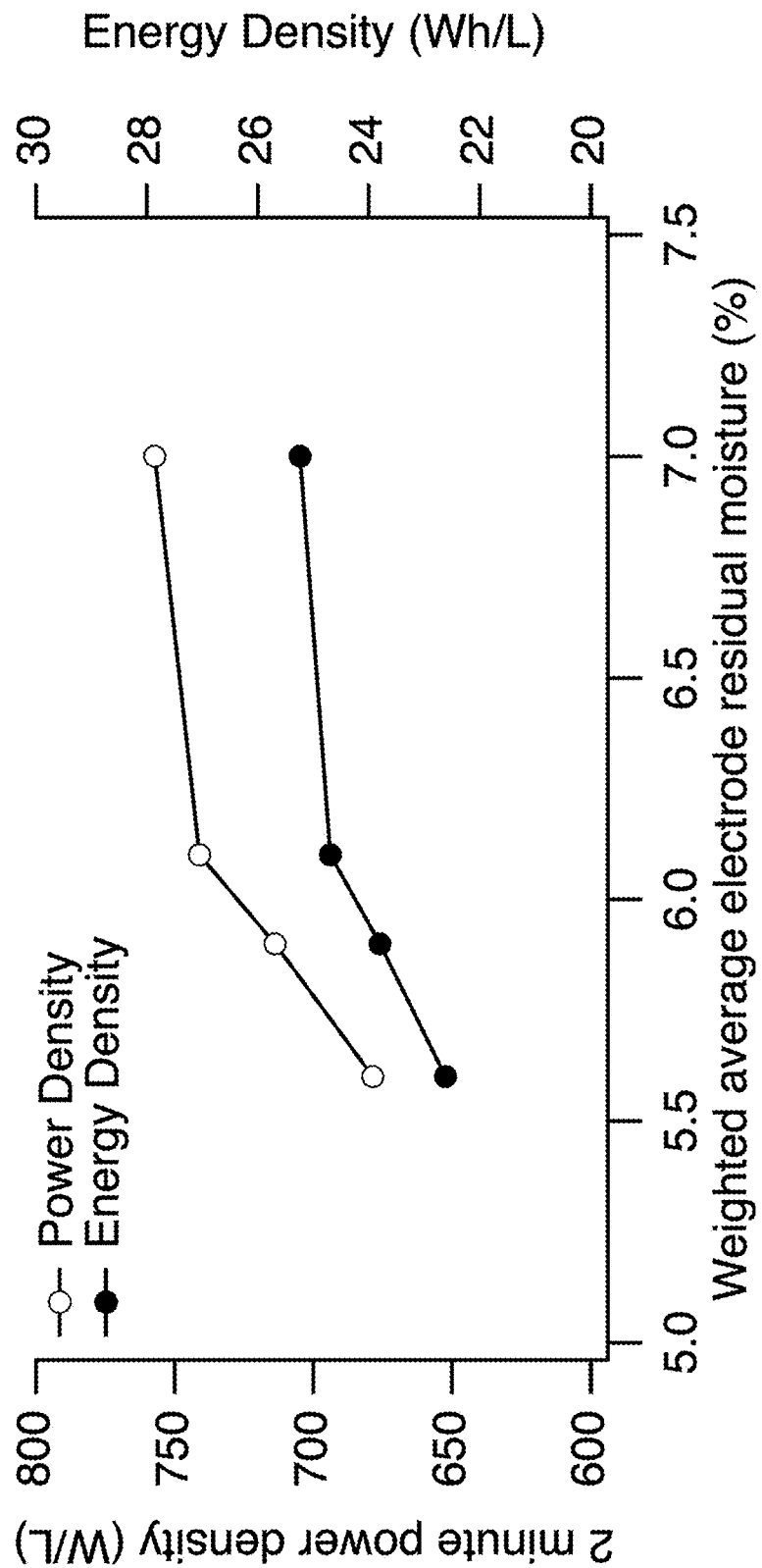
FIG. 6 illustrates a power density and energy density of the capacity-limiting electrode of a full cell containing a sodium manganese hexacyanomanganate TMCCC anode and a sodium manganese iron hexacyanoferrate TMCCC cathode—both the power density and energy density decrease as the weighted average residual moisture of the two electrodes decreases.
Figure 7:
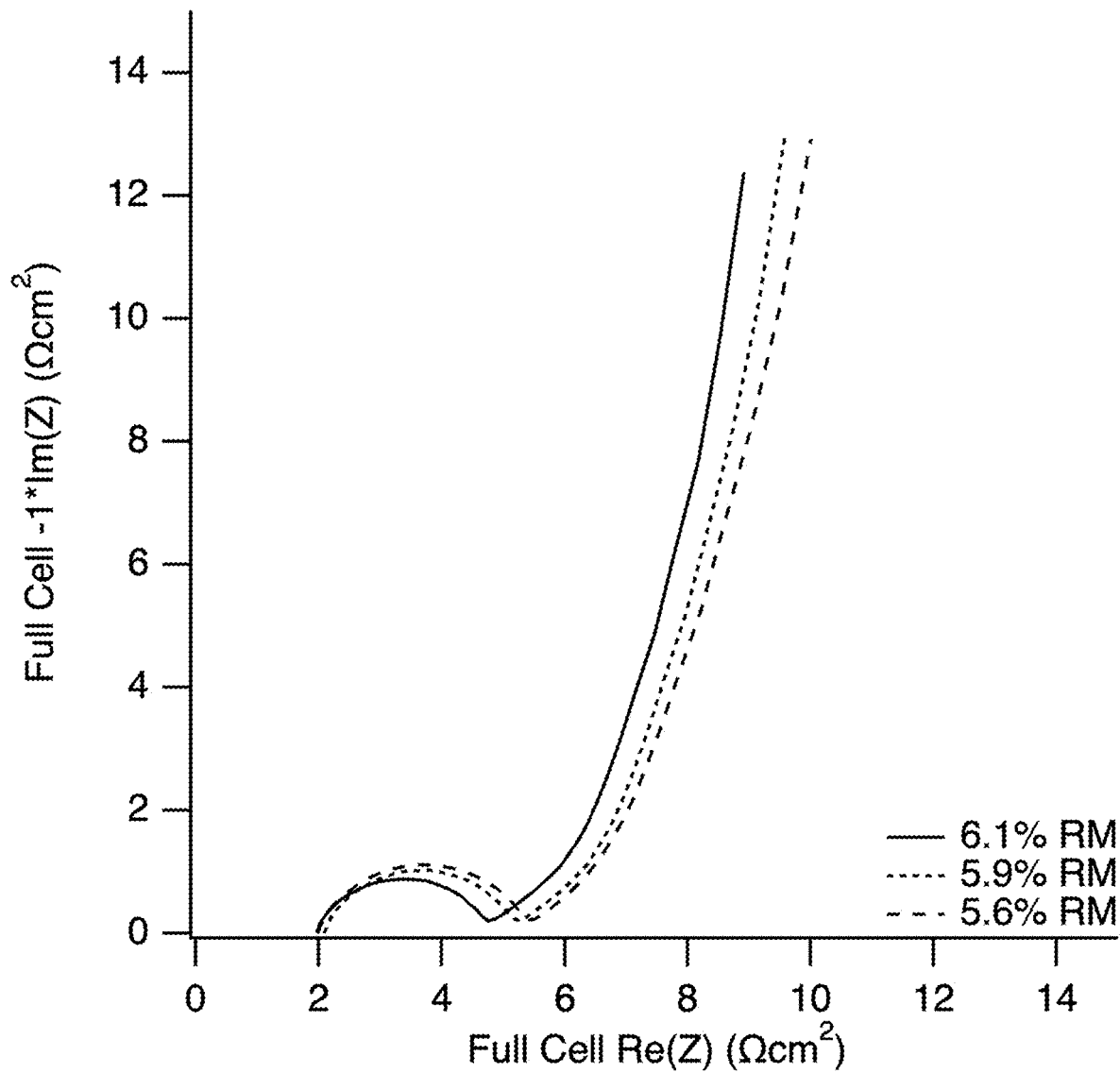
FIG. 7 illustrates an electrochemical impedance spectra of full cells containing a sodium manganese hexacyanomanganate TMCCC anode and a sodium manganese iron hexacyanoferrate TMCCC cathode as a function of the weighted average residual moisture of the two electrodes.

FIG. 5 illustrates a specific capacity of the capacity-limiting electrode of a full cell containing a sodium manganese hexacyanomanganate TMCCC anode and a sodium manganese iron hexacyanoferrate TMCCC cathode. The capacity decreases as the weighted average residual moisture of the two electrodes decreases;

FIG. 6 illustrates a power density and energy density of the capacity-limiting electrode of a full cell containing a sodium manganese hexacyanomanganate TMCCC anode and a sodium manganese iron hexacyanoferrate TMCCC cathode. Both the power density and energy density decrease as the weighted average residual moisture of the two electrodes decreases;

FIG. 7 illustrates an electrochemical impedance spectra of full cells containing a sodium manganese hexacyanomanganate TMCCC anode and a sodium manganese iron hexacyanoferrate TMCCC cathode as a function of the weighted average residual moisture of the two electrodes.

FIG. 8 illustrates a service life of full cells containing a sodium manganese hexacyanomanganate TMCCC anode and a sodium manganese iron hexacyanoferrate TMCCC cathode during float testing at 45° C. In this test, the cell was continuously floated at a maximum voltage of 1.859 V and fully discharged at a 1 C rate once daily. The cells having the lowest weighted average residual moisture are most stable and have the longest life.

FIG. 5-FIG. 7 show that the trends observed for individual cathodes and anodes are also true for full cells. The dryer the electrodes in the full cell, the lower the cell's capacity, power, and energy, and the higher their impedance. However, FIG. 8 shows that the longest service life is achieved by cells that contain the driest electrodes. Therefore, an optimal cell will contain electrodes that include an intermediate amount of residual moisture that strikes an optimum balance between performance metrics such as cell life (favoring dryer electrodes) and high capacity and low resistance (favoring wetter electrodes).

FIG. 9 tabulates the initial and final residual moistures, coordinated water, and non-coordinated water for selected examples. In each case, the non-coordinated water decreases during processing of the samples including a dehydration step. The temperature used during the dehydration step was no more than 120° C., which allowed selective removal of non-coordinated water from the TMCCC sample without removal of the coordinated water.

To determine the composition of each TMCCC material, inductively coupled plasma (ICP) and Karl Fischer (KF) analysis was performed. The ICP data was analyzed using KF data for the value of oxygen, and then forcing charge balance to the known initial state of charge of the TMCCC material. Coordinated water content was then assumed to be directly proportional to the vacancy molar fraction. The non-water content of the material is expressed as 100% mass basis, and water is expressed as an additional mass percentage over this basis. KF values measured for electrodes were converted from % total electrode mass as a function of sample weight (regardless of water content) to instead reflect water mass percentage with respect to the non-water TMCCC mass, which is always normalized to 100%. The stoichiometric ratio of coordinated and uncoordinated water is used to determine the undried proportion of water as measured by KF. For these calculations it is assumed that all non-coordinated water is removed during drying before any coordinated water.

FIG. 10 tabulates example compositions of two TMCCC materials on a molar basis and provides example calculations of the residual moisture on a mass percentage basis from these molar compositions. The coordinated water is proportional to the vacancy content of each TMCCC material, while the non-coordinated water depends on the synthesis and processing conditions before the measurement of composition.

CONCLUSION

Reference [2] and Reference [3] teach that any amount of trace water in a cell results in degraded cell performance. Embodiments of the present invention are believed novel and non-obvious because, at least in part, TMCCC electrodes are dried to a nonzero RM in which the presence of some water in the materials, within a described range, actually improves cell performance, thereby allowing it to be optimized.

The concept of performing a single dehydrating/hydrating process on a fully assembled cell stack is also believed novel and non-obvious. Such a process is practical because, at least in part, a nonzero RM is desired and implemented. The reason for this is that the composition of a TMCCC material determines its affinity for water and the equilibrium RM is reached at a particular ambient temperature and pressure. When two electrodes, each containing a unique TMCCC material, are placed in proximity with one another, the one that has a higher affinity for water and a higher equilibrium RM will absorb water from the other until the two of them reach an equilibrium. Performing a drying/hydrating step on a cell stack containing two TMCCC electrodes may therefore result in a transfer of water from one electrode to the other in addition to the net loss of water observed in a conventional drying process. This water transfer between electrodes may further degrade the performance of the electrochemical cell.

Performing a single drying step on a cell stack is therefore advantageous for two reasons. First, it is a simpler process than performing separate drying steps on each of the two electrodes before assembly into a cell stack. Second, the single drying step results in both a net loss of water (net drying) of the whole cell stack, but also a net transfer of water between the two electrodes until they reach an equilibrium with one another. A chemical equilibrium represents a system's most stable state at a particular set of conditions (temperature, pressure, etc.). A cell stack in which the two electrodes each contain an equilibrium amount of water is most stable, and the least possible amount of that water will be chemically active. Therefore, by equilibrating the two electrodes with one another via a single drying step, the optimal RM for optimal cell performance may be achieved while simultaneously reaching an equilibrium in which the RM of each of the two electrodes is most chemically stable and least reactive.

FIG. 9 illustrates the residual moisture, coordinated water, and non-coordinated water before and after drying for selected examples described herein. By expressing the residual moisture in this way, it is possible to have a discussion of the water in the composition of matter of the material. FIG. 10 illustrates selected compositions of examples described herein. For both the anode and cathode, the composition of the material is reported on a molar basis. Further, the residual moisture, coordinated water, and non-coordinated water are calculated on a mass percentage basis. Thus, the residual moistures measured for each sample in the specification are related back to the compositions of the TMCCC materials of those examples. For example, the composition of the as-synthesized anode includes n=1.6 and m=1.1 (following the description of composition used herein). In this case, m=1.1 corresponds to 7% non-coordinated water for the as-synthesized material. That decreases during the processing as described herein. For instance, in example 1, the final non-coordinated water is 6.1%, which corresponds to m=0.96.

The TMCCC materials as initially manufactured may have non-coordinated water in the range of about 5-15%, which corresponds to about m=1.0 to 2.0. In FIG. 10, it is shown that for each of the examples included that, post-processing, non-coordinated water is reduced to about 0-10%, or equivalently, to about m=0 to 1.5.

References—Expressly Incorporated Herein by Reference Thereto:

Reference [1]—Imhof, R. In Situ Investigation of the Electrochemical Reduction of Carbonate Electrolyte Solutions at Graphite Electrodes. J. Electrochem. Soc., 145, 1081-1087 (1998)

Reference [2]—U.S. Pat. No. 9,099,718 B2 (Lu '718)

Reference [3]—Wu, J, et al, J. Am. Chem. Soc., 139, 18358-18364 (2017),

The system and methods above have been described in general terms as an aid to understanding details of preferred embodiments of the present invention. In the description herein, numerous specific details are provided, such as examples of components and/or methods, to provide a thorough understanding of embodiments of the present invention. Some features and benefits of the present invention are realized in such modes and are not required in every case. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and

What is claimed as new and desired to be protected by Letters Patent of the United States is:

1. A method of producing a cell stack for an electrochemical cell including a plurality of layers, each including an anode electrode, a cathode electrode, and a separator interposed therebetween, and wherein all of the anodes in the plurality of layers are in electronic communication, and wherein all of the cathodes in the plurality of layers are in electronic communication, and wherein at least one electrode includes a coordinated compound material including a water content quantity that includes a degradation of a set of electrochemical properties when present during an electrochemical cycling of the cell stack, comprising:
   a) manufacturing a set of electrodes wherein said set of electrodes all include the anode electrodes and the cathode electrodes with the coordination compound having the water content;
   b) assembling the cell stack using said set of electrodes including the water content, said cell stack assembling b) producing an assembled cell stack having said subset of electrodes including the water content; and
   c) exposing said assembled cell stack having said set of electrodes including the water content to a water mediating process configured to mediate the water content of said electrodes of said set of electrodes within a mediated water content quantity;
   wherein said mediated water content quantity includes a reduction of the degradation of the set of electrochemical properties when present during an electrochemical cycling of said assembled cell stack
   wherein said mediated water content quantity includes a residual moisture for all electrodes of said set of electrodes greater than or equal to four percent; and
   wherein said set of electrodes contain both non-zero coordinated and non-coordinated water when said residual moisture for all electrodes of said set of electrodes is greater than or equal to four percent.

2. The method of claim 1 wherein said electrodes including the coordinated compound material having said mediated water content quantity include a formula:

wherein A is one or more alkali cations,
wherein P and R are one or more divalent or trivalent transition metal cations,
wherein $0.5<z<1$,
wherein $n=6*(1-z)+m$, and wherein $n>0$
wherein $6*(1-z)$ is the quantity of lattice bound water and m is the quantity of non-coordinated water, and
wherein $m \geq 0$
wherein $0 \leq x \leq 2$, and $y=1$.

3. The method of claim 1 wherein said exposing said assembled cell stack step occurs within an environmentally controlled chamber configured for said water mediating process to be applied to said assembled cell stack and wherein said assembling the cell stack step is performed outside of said environmentally controlled chamber.

4. A method of producing a cell stack of an electrochemical cell, including a plurality of layers, each layer including an anode electrode, a cathode electrode, and a separator interposed therebetween, and wherein all of the anodes in said plurality of layers are in electronic communication, and wherein all of the cathodes in said plurality of layers are in electronic communication, and wherein each of the electrodes include a coordinated compound material, having a residual moisture outside of a desired residual moisture profile, comprising:
   a) assembling the cell stack while the residual moisture of the electrodes in each electrochemical cell is outside of the desired residual moisture profile; and thereafter:
   b) exposing the cell stack to a water mediating process to adjust the residual moisture of the electrodes in each electrochemical cell within the desired residual moisture profile greater than or equal to four percent; and
   wherein the electrodes contain both non-zero coordinated water and non-coordinated water when the residual moisture for all the electrodes is greater than or equal to four percent.

5. The method of claim 4 wherein the coordinated compound materials includes a TMCCC material having a first quantity of coordinated water and a second quantity of non-coordinated water, wherein the residual moisture profile includes said first quantity of coordinated water disposed within a first target range, and wherein the residual moisture profile includes said second quantity of non-coordinated water disposed below a second target range.

6. The method of claim 5 wherein the anode electrode includes said TMCCC material and wherein said TMCCC material includes manganese hexacyanomanganate.

7. The method of claim 4 wherein the electrodes including the coordinated compound material include a formula:

wherein A is one or more alkali cations,
wherein P and R are one or more divalent or trivalent transition metal cations,
wherein $0.5<z<1$,
wherein $n=6*(1-z)+m$, and wherein $n>0$
wherein $6*(1-z)$ is the quantity of lattice bound water and m is the quantity of non-coordinated water, and
wherein $m \geq 0$; and
wherein $0 \leq x \leq 2$, and $y=1$.

8. The method of claim 4 wherein said exposing the cell stack step occurs within an environmentally controlled chamber configured for said water mediating process and wherein said assembling the cell stack step is performed outside of said environmentally controlled chamber.

* * * * *